United States Patent
Heckel (10) Patent No.: US 11,126,482 B1
(45) Date of Patent: Sep. 21, 2021

(54) REMOTE LOGGING VIA TELEMETRY

(71) Applicant: Microsoft Technology Licensing, LLC, Redmond, WA (US)

(72) Inventor: Todd Arthur Heckel, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/826,095

(22) Filed: Mar. 20, 2020

(51) Int. Cl.
  *G06F 9/54* (2006.01)
  *A63F 13/352* (2014.01)
  *A63F 13/21* (2014.01)

(52) U.S. Cl.
  CPC ............ *G06F 9/546* (2013.01); *A63F 13/21* (2014.09); *A63F 13/352* (2014.09); *G06F 9/541* (2013.01)

(58) Field of Classification Search
  None
  See application file for complete search history.

(56) References Cited

U.S. PATENT DOCUMENTS

| | | | |
|---|---|---|---|
| 8,621,275 B1 * | 12/2013 | Havemose | G06F 11/1448 714/13 |
| 9,105,178 B2 | 8/2015 | Carlson et al. | |
| 2003/0037149 A1 * | 2/2003 | Hess | G06Q 30/06 709/227 |
| 2005/0044551 A1 * | 2/2005 | Sodhi | G06F 9/546 719/312 |
| 2008/0176638 A1 * | 7/2008 | Goodman | G07F 17/32 463/25 |
| 2009/0113303 A1 | 4/2009 | Goossen et al. | |
| 2012/0311387 A1 | 12/2012 | Santhosh et al. | |
| 2016/0041894 A1 | 2/2016 | Reid et al. | |

(Continued)

FOREIGN PATENT DOCUMENTS

WO 0047003 A1 8/2000

OTHER PUBLICATIONS

"Building a Mobile Gaming Analytics Platform—a Reference Architecture", Retrieved from: https://web.archive.org/web/20160121154957/https:/cloud.google.com/solutions/mobile/mobile-gaming-analysis-telemetry, Jan. 21, 2016, 08 Pages.

(Continued)

*Primary Examiner* — Craig C Dorais
(74) *Attorney, Agent, or Firm* — Ray Quinney & Nebeker; Tiffany Healy (57) ABSTRACT

The present disclosure relates to devices and methods for remotely saving console output messages. The devices and methods may generate console output messages for an application running on the game device. The devices and method may redirect the console output messages from presenting on the console to a console message queue and generate a single console telemetry event in response to a trigger event. The console telemetry event may capture a plurality of the console output messages in the console message queue. The device and methods send the console telemetry event for remote storage. In addition, the devices and methods may use a remote program console to access or otherwise view the stored console telemetry events. The remote program console may be used to filter or search the stored console telemetry events.

20 Claims, 6 Drawing Sheets

(56) References Cited

U.S. PATENT DOCUMENTS

2016/0292057 A1 10/2016 Segger
2018/0067864 A1* 3/2018 Park .................. G06F 9/546

OTHER PUBLICATIONS

"Standalone Telemetry JS Library", Retrieved from: http://web.archive.org/web/20190712011021/http:/docs.sunbird.org/latest/developer-docs/telemetry/jslibrary/index.html, Jul. 12, 2019, 23 Pages.

"Standard Events", Retrieved from: https://docs.unity3d.com/Manual/UnityAnalyticsStandardEvents.html?Lga=2.182696870.169171289.1582733618-644221963.1582733618, Mar. 2, 2018, 09 Pages.

Cenerelli, Ken, "Microsoft Application Insights: Custom Telemetry Events with TrackEvent", Retrieved from: https://social.technet.microsoft.com/wiki/contents/articles/31192.microsoft-application-insights-custom-telemetry-events-with-trackevent.aspx, May 31, 2015, 04 Pages.

Drachen, et al., "Game Analytics—The Basics", In Publication of Springer, Mar. 6, 2013, pp. 13-40.

Nash, Brent, "Building an Event-Based Analytics Pipeline for Amazon Game Studios' Breakaway", Retrieved from: https://aws.amazon.com/blogs/big-data/building-an-event-based-analytics-pipeline-for-amazon-game-studios-breakaway/, Dec. 15, 2016, 09 Pages.

Polvi, Teemu, "Using Spatial Analytics to Evaluate Design Decisions in a Mobile Game", In Thesis of Tampere University of Technology, May 2, 2018, 74 Pages.

"International Search Report and Written Opinion issued in PCT Application No. PCT/US21/015348", dated May 12, 2021, 20 Pages.

* cited by examiner

FIG. 1

| Category 202 | Time Stamp 204 | Client Device ID 206 | Event Level 208 | Build Version 210 | Line Number 212 | Console Text Output Message 214 |

REMOTE LOGGING VIA TELEMETRY

BACKGROUND

Most computer applications are tested and debugged during development using a console to output information about the operation and/or status of the application. Usually when an application is released to the public, the console is disabled because the console is no longer useful when the application is in use by an end user. When problems in applications arise in applications after release, the problems often may only be reproduced by a real user resulting in more difficulty in understanding and/or resolving the problems.

These and other problems exist relating to console output.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a game device. The game device may include a memory to store data and instructions; and at least one processor operable to communicate with the memory, wherein the at least one processor is operable to: generate console output messages for an application running on the game device, wherein a console is unavailable or disabled on the game device; redirect the console output messages from presenting on the console to a console message queue; and generate a single console telemetry event in response to a trigger event, wherein the console telemetry event captures the console output messages in the console message queue.

Another example implementation relates to a method. The method may include generating, at a game device, console output messages for an application running on the game device, wherein a console is unavailable or disabled on the game device. The method may include, redirecting the console output messages from presenting on the console to a console message queue. The method may include generating a single console telemetry event in response to a trigger event, wherein the console telemetry event captures the console output messages in the console message queue.

Another example implementation relates to a computer-readable medium storing instructions executable by a computer device. The computer-readable medium may include at least one instruction for causing the computer device to generate console output messages for an application running on a game device, wherein a console is unavailable or disabled on the game device. The computer-readable medium may include at least one instruction for causing the computer device to redirect the console output messages from presenting on the console to a console message queue. The computer-readable medium may include at least one instruction for causing the computer device to generate a single console telemetry event in response to a trigger event, wherein the console telemetry event captures the console output messages in the console message queue.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

DETAILED DESCRIPTION

This disclosure generally relates to recording console output remotely. Most computer applications are tested and debugged during development using a console. The console may include an interface with a text window to which text messages may be output with information regarding an operation and/or status of an application. The console output may help users, such as, application developers, troubleshoot problems that occur during application development and/or after release of the application.

A user typically needs to be located near the console to view the console output and use the information provided to debug and/or troubleshoot the application. One example application may include a digital game. However, when games are beta tested games may be placed on a plurality of user machines remote from the developers and the developers may not be able to view the console output as the games are played on the user machines. In addition, game devices, such as video game consoles, may only have video output without a console where text may be entered or displayed and/or the console may be disabled on the game devices. As such, accessing or otherwise viewing console output from game clients becomes difficult.

Moreover, when an application is released to the public, the console is typically disabled. When problems arise after a release of an application, it may be more difficult to understand and resolve the problems, as the problems may often be only reproduced by real users. Console output generally is often saved to a file on the device used for testing. Thus, limiting the accessibility of and/or retention life of console output.

The present disclosure includes several practical applications that provide benefits and/or solve problems associated with recording console output remotely. The devices and methods may redirect console output for one or more applications being used by a plurality of game devices to a remote data repository for storage. In an implementation, the game devices may be used by users, such as, but not limited to, application developers to create or otherwise program applications. In another implementation, the game devices may be used by end users to run or otherwise use an application.

The devices and methods may generate console output messages for applications running on a plurality of game devices. The device and methods may redirect the console output messages from presenting on the console and may use the console output messages to generate one or more new console telemetry events. The console telemetry events may be used to acquire the console output messages from a plurality of game devices and store the console output remotely. The console telemetry events may include a plurality of console output messages with text information regarding an operation and/or status of the applications. In addition, each console telemetry event may include a plurality of fields identifying the information captured for the applications.

The game devices may hold a plurality of console output messages in a console message queue and may generate a single console telemetry event for the plurality of console output messages in the console message queue in response to a trigger event. For example, when the console message queue is full, a single console telemetry event may be generated for all the console messages in the console message queue.

The game devices may transmit the console telemetry event to an event queue and may transmit a plurality of console telemetry events at the same time for remote storage in a telemetry service. In an implementation, the game devices may transmit the plurality of console telemetry events in response to an occurrence of one or more trigger events.

The telemetry subsystem may receive console telemetry events from a plurality of game devices for an application. The telemetry service may include a data repository that stores the received console telemetry events with the information relating to the applications.

The devices and methods may provide a remote program console to emulate a program console remotely from the game devices to view the console output generated by applications running on game devices outside of the development environment. For example, the remote program console may include, but is not limited to, a web-based dashboard or report style application. The remote program console may also be used to view the console output generated by applications during the development process. The remote program console may apply query techniques to further filter the console output using one or more parameters by sending one or more queries to the telemetry subsystem.

By recording the console output remotely, the console output may be accessed later by using the remote program console in an environment potentially more suited to understanding and/or resolving any issues. As such, the remote program console may provide a more flexible and/or useful tool than a native console. Moreover, by aggregating the console output from a plurality of devices and recording the console output remotely, the console output may be efficiently processed and/or filtered by query-based techniques using the remote program console, making the console output easier to analyze and understand the vast amount of information generated by applications in development across a large number of devices.

Figure 1:
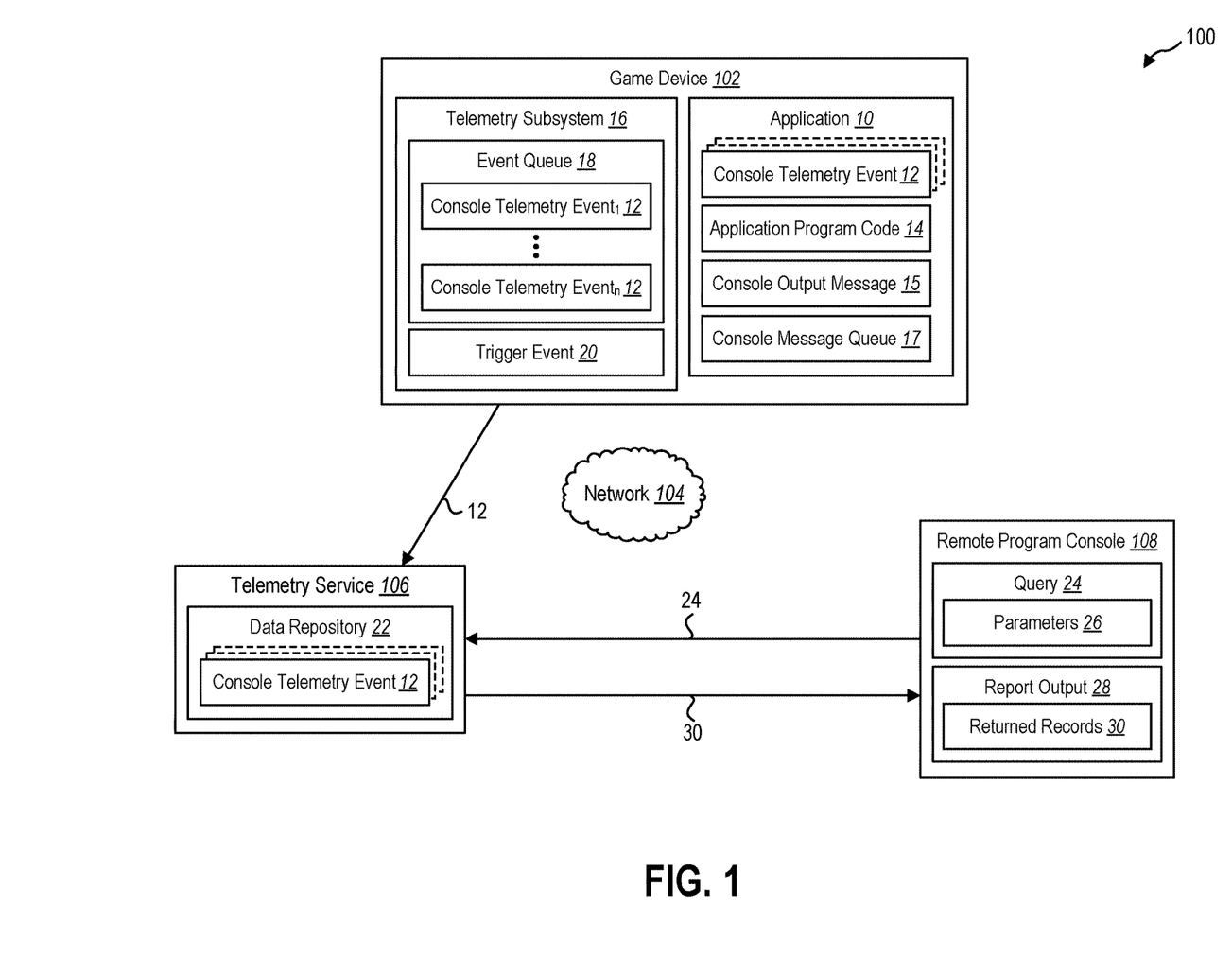
FIG. 1 is a schematic diagram of an example environment in accordance with an implementation of the present disclosure.

Referring now to FIG. 1, illustrated is an example environment 100 including one or more game devices 102 for use with applications 10. One example application 10 may include a digital game actively being played by a user on game device 102. Game device 102 may access applications 10 from a remote server via network 104. For example, game device 102 may download applications 10 from the remote server and/or save applications 10 to game device 102. Another example may include game device 102 streaming games from the remote server. For example, the remote server may include a console and the console information, such as, but not limited to, the console output and/or any console telemetry events 12.

The game devices 102 may refer to various types of computing devices. The game device 102 may refer to dedicated gaming devices (e.g., handheld gaming devices) or a video game console in communication with a display device. In one or more implementations, one or more of the game devices 102 include graphical user interfaces thereon (e.g., a screen of a mobile device). In addition, or as an alternative, one or more of the game devices 102 may be communicatively coupled (e.g., wired or wirelessly) to a display device having a graphical user interface thereon for providing a display of application content. The game devices 102 may also include a mobile device such as a mobile telephone, a smart phone, a personal digital assistant (PDA), a tablet, or a laptop. Additionally, or alternatively, the game devices 102 may include one or more non-mobile devices such as a desktop computer, server device, or other non-portable device. The telemetry service 106 may similarly refer to various types of computing or game devices. In addition, remote program console 108 may be accessed using the various types of computing or game devices 102. Each of the devices and/or components of the environment 100 may include features and functionality described below in connection with FIG. 6.

Moreover, the components of telemetry service 106 and/or remote program console 108 may include hardware, software, or both. For example, the components of telemetry service 106 and/or remote program console 108 may include one or more instructions stored on a computer-readable storage medium and executable by processors of one or more computing devices. When executed by the one or more processors, the computer-executable instructions of one or more computing devices (e.g., telemetry service 106 and/or remote program console 108) can perform one or more methods described herein. Alternatively, the components of telemetry service 106 and/or remote program console 108 may include hardware, such as a special purpose processing device to perform a certain function or group of functions. Additionally, or alternatively, the components of telemetry service 106 and/or remote program console 108 may include a combination of computer-executable instructions and hardware.

Game devices 102 may generate console output messages 15 as applications 10 execute or otherwise run on game devices 102. Console output messages 15 may include, but are not limited to, text output with information regarding an operation and/or status of application 10. For example, users may use the console output messages 15 to debug and/or troubleshoot the application.

Application 10 may include commands throughout the application program code 14 to generate or otherwise capture information to include in the console output messages 15. For example, application program code 14 may call a function and provide one or more arguments to populate the fields of the console output messages 15. One example may include a plurality of LOG commands throughout the application program code 14 to record the application information and present information on the console. As such, as the commands execute in the application program code 14, console output messages 15 may be generated with the information relating to applications 10.

In an implementation, the console may be unavailable or disabled on the game device 102 resulting in the inability to display or otherwise access the console output messages 15 for application 10. As such, the console output messages 15 for application 10 may be unavailable or otherwise inaccessible by users.

The console output messages 15 may be redirected to a console message queue 17 instead of outputting on a console of game device 102. The logic to redirect the console output to the console message queue 17 may be added to existing program code with minimal changes. For example, changes to each of the various commands throughout application program code 14 to generate the console output messages 15 may be unnecessary in order to redirect the console output messages 15 to the console message queue 17. In addition, the console output messages 15 may be redirected to a console message queue 17 in addition to presenting on a console of game device 102.

In an implementation, a portion of the console output messages 15 may be filtered or otherwise removed from transmitting to the console message queue 17. As such, instead of sending all the console output messages 15 to the console message queue 17, a portion or a subset of the console output messages 15 may be transmitted to the console message queue 17. The filtering may be applied to improve system performance by reducing the amount of console output messages 15 redirected to the console message queue 17.

The console output messages 15 in console message queue 17 may be used to generate new console telemetry events 12. For example, a new console telemetry event 12 may be generated for a plurality of console output messages 15 in response to a trigger event. An example trigger event may include the number of console output messages 15 waiting in the console message queue 17 reaching a predetermined number (e.g., when the console message queue 17 is full or one hundred console messages 15). For example, a new console telemetry event 12 may be generated when the number of console output messages 15 waiting in the console message queue 17 reaches a maximum capacity of the console message queue 17. The new console telemetry event 12 may include all the console output messages 15 currently in the console message queue 17. Another example trigger event may include a predetermined time interval. For example, a new console telemetry event 12 may be generated with all the console output messages 15 waiting in the console message queue 17 after ten minutes. Another example trigger event may include exiting or closing application 10. For example, a new console telemetry event 12 may be generated with the console output messages 15 in the console message queue 17 when application 10 closes. Moreover, new console telemetry events 12 may be generated in response to the occurrence of a combination of trigger events occurring. For example, a new console telemetry event 12 may be generated from the plurality of console output messages 15 in the console message queue 17 after twenty minutes and after two hundred console output messages 15 are received in console message queue 17.

As such, a single console telemetry event 12 may include an aggregation of a plurality of console output messages 15 generated by application 10. Once a new console telemetry event 12 is generated using the console output messages 15 in the console message queue 17, the console message queue 17 may start receiving additional console output messages 15 in response to commands executing in application 10.

Each console telemetry events 12 may include a plurality of fields identifying the information captured for application 10. In addition, console telemetry events 12 may include information regarding events generated in response to a user action.

One example may include console telemetry events 12 providing information about current network conditions of game device 102. Another example may include console telemetry events 12 providing information about errors in applications 10. Another example may include console telemetry events 12 providing information used to analyze the game to understand whether the game is balanced. For example, console telemetry events 12 may identify that users selected to use more items (e.g., costumes, dance moves, music, expansion packs, power-ups, downloadable content, and/or other items or add-ons that may be used in a game) in the game relative to other items in the game.

Figure 2A:
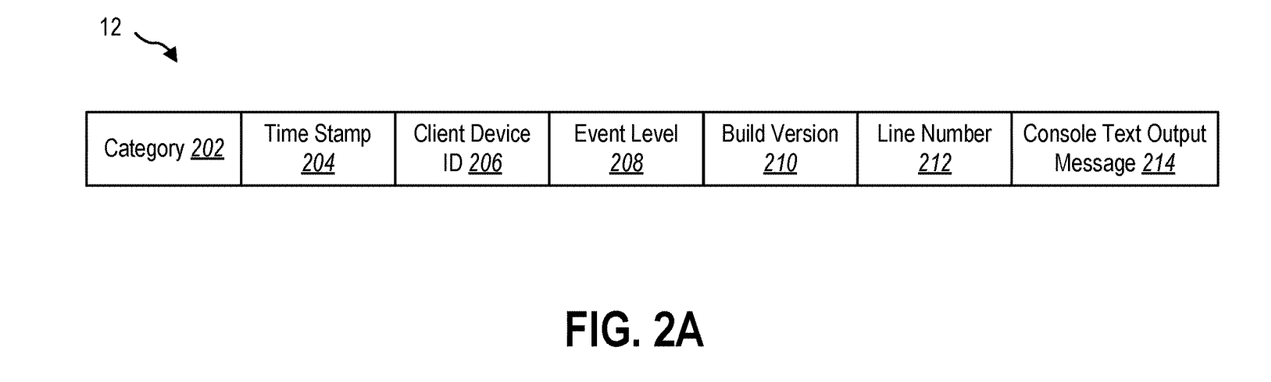
FIGS. 2A and 2B illustrate example console telemetry events in accordance with an implementation of the present disclosure.

Referring now to FIG. 2A, illustrated is an example console telemetry event 12 with a plurality of fields. One example field may include a category 202 of the console telemetry event 12. Example categories 202 may include, but are not limited to, network information, physics information, artificial intelligence (AI) information, graphics information, items used during gameplay, and/or system information. Another example field may include a timestamp 204 indicating a time when console telemetry event was generated.

Another example field may include a game device identification (ID) 206. The game device ID 206 may uniquely identify the game device 102 that generated console telemetry event 12. Another example field may include an event level 208 that indicates a priority level for console telemetry event 12. Example event levels 208 may include, but are not limited to, error, warning, information, and/or exception.

Yet another example field may include a build version 210 of application 10. Another example field may include a line number 212 of the application program code 14 (FIG. 1) where console telemetry event 12 was generated. Another example field may include a console output text message 214. The console output text message 214 may include text with information displayed or otherwise outputted on the console in response to the commands in the application program code 14.

The fields may be used to include and/or exclude messages from search results of console telemetry events 12. Moreover, the fields may be used to perform different processing on console telemetry events 12. For example, a console telemetry event 12 with an error level may be processed or handled differently than a console telemetry event 12 with a warning level. The fields may also be used to identify similarities between console telemetry events 12 and/or common data shared among console telemetry events 12. The similarities between console telemetry events 12 may be used as part of a query 24 (FIG. 1) to do a join operation cross referencing other console telemetry events 12 using a common field. For example, a query 24 may cross reference other console telemetry events 12 using a common user ID.

Figure 2B:
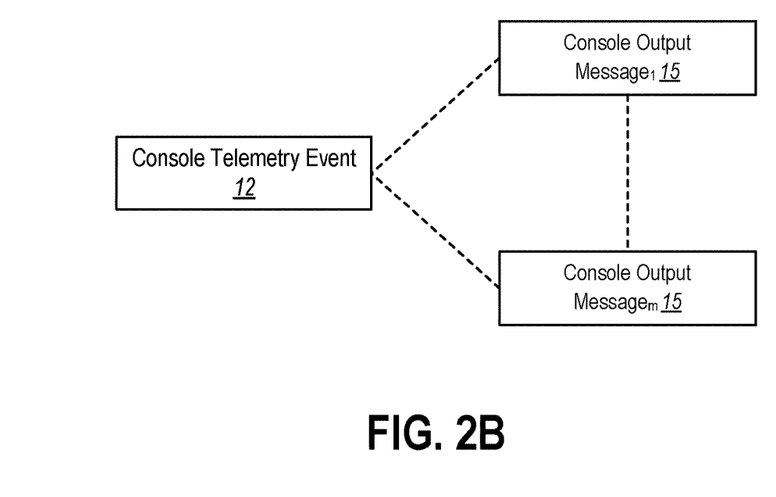

Referring now to FIG. 2B, illustrated is an example console telemetry event 12 that includes a plurality of console output messages 15 (up to m, where m is an integer). Instead of generating a single console telemetry event 12 in response to each command (e.g., LOG commands) in the application program code 14 (FIG. 1), a single console telemetry event 12 may include a group or bundled of console output messages 15 generated in response to a plurality of commands in the application program code 14. For example, 100 console output messages 15 from the same game device 102 may be grouped together into a single console telemetry event 12. By consolidating a plurality of console output messages 15 into a single console telemetry event 12, a system processing cost associated with transmitting console telemetry events 12 may be reduced.

Referring to FIG. 1, game device 102 may include a telemetry subsystem 16 that may receive one or more console telemetry events 12 generated by application 10. In an implementation, the console may be unavailable or disabled on the game device 102 resulting in the inability to display or otherwise access the console output messages 15 for application 10. Telemetry subsystem 16 may be used to redirect the otherwise inaccessible console output messages 15 for application 10 for remote storage and/or remote access.

As such, the console output messages 15 may be redirected to the telemetry subsystem 16 using console telemetry events 12 instead of outputting on a console of game device 102. In addition, the console output messages 15 may be redirected to the telemetry subsystem 16 using console telemetry events 12 in addition to outputting on a console of game device 102. As such, application developers may continue to have messages presented on the console during application development while console telemetry events 12 may also be sent to the telemetry subsystem 16 for remote storage.

Telemetry subsystem 16 may transmit console telemetry events 12 to a remote telemetry service 106 for storage via network 104. For example, telemetry subsystem 16 may send console telemetry events 12 to telemetry service 106 using a Hypertext Transfer Protocol (HTTP) request. Telemetry subsystem 16 may hold a plurality of console telemetry events 12 (up to n, where n is an integer) in an event queue 18 and may transmit a plurality of console telemetry events 12 at the same time to telemetry service 106. By transmitting a plurality of console telemetry events 12 together to telemetry service 106 instead of individually transmitting each console telemetry event 12 upon receipt, a system processing cost associated with transmitting the console telemetry events 12 may be reduced.

Telemetry subsystem 16 may transmit a plurality of console telemetry events 12 in response to the occurrence of one or more trigger events 20. An example trigger event 20 may include a predetermined number of events waiting in event queue 18. For example, telemetry subsystem 16 may transmit the plurality of console telemetry events 12 in response the number of console telemetry events 12 in event queue 18 reaching the predetermined number of events (e.g., one hundred console telemetry events 12). Another example trigger event 20 may include a predetermined time interval. For example, telemetry subsystem 16 may transmit the plurality of console telemetry events 12 in event queue 18 upon the predetermined time interval elapsing (e.g., every ten minutes). Another example trigger event 20 may include exiting or closing application 10. For example, telemetry subsystem 16 may transmit the plurality of console telemetry events 12 before application 10 shuts down. Moreover, telemetry subsystem 16 may transmit the plurality of console telemetry events 12 in response to the occurrence of a combination of trigger events 20 occurring. For example, telemetry subsystem 16 may transmit the plurality of console telemetry events 12 after twenty minutes and two hundred console telemetry events 12 are received in event queue 18.

In an implementation, telemetry subsystem 16 may filter the plurality of console telemetry events 12 and send a subset of the plurality of console telemetry events 12. For example, telemetry subsystem 16 may filter the plurality of console telemetry events 12 using the one or more fields of console telemetry events 12. One example may include sending a subset of console telemetry events 12 that have an error as the event level. As such, instead of sending all console telemetry events 12, telemetry subsystem 16 may only send a portion or a subset of console telemetry events 12 to telemetry service 106.

Telemetry service 106 may include a data repository 22 that stores the received console telemetry events 12 with information relating to applications 10. Telemetry service 106 may receive console telemetry events 12 from a plurality of game devices 102. In addition, telemetry service 106 may receive console telemetry events 12 for a plurality of applications 10. Each console telemetry event 12, may include a plurality of console output messages 15. As such, data repository 22 may include a vast amount of information relating to a plurality of applications 10 from a plurality of game devices 102. The information may be generated during the development process of application 10 across a plurality of game devices 102. In addition, the information may be generated during execution of application 10 across a plurality of game devices 102. The information may be used at later times to understand and/or resolve any issues relating to applications 10 that may arise.

A remote program console 108 may be used to access console output from telemetry service 106 via network 104. Remote program console 108 may emulate a program console remotely from game devices 102 so that users may view, or otherwise access, the console output 15 generated by applications 10 running on game devices 102. For example, remote program console 108 may be a web-based dashboard or report style application that a user may access to view or otherwise access console telemetry events 12 stored by telemetry service 106. Remote program console 108 may be used to access console output generated by applications 10 running on game devices 102 and may allow users to view console output 15 outside of the development environment.

Users may access remote program console 108 anytime a user may want to understand what type of data application 10 may be outputting to the console. In addition, users may access remote program console 108 to troubleshoot errors and/or issues relating to application 10. Remote program console 108 may provide information regarding application 10 in an easy to understand manner.

For example, a user may select one or more parameters 26 using remote program console 108 to use when searching console telemetry events 12. Example parameters 26 may include, but are not limited to, a category, a timestamp, an event level, a device ID, and/or a build version. Remote program console 108 may generate one or more queries 24 in response to the selected parameters 26.

Remote program console 108 may send one or more queries 24 to telemetry service 106 to access or otherwise retrieve console telemetry events 12 stored in data repository 22. Remote program console 108 may filter the console telemetry events 12 by applying one or more parameters 26 to the query 24.

Telemetry service 106 may receive the queries 24 from remote program console 108 and may return one or more records 30 that match the parameters 26 of the query 24. Remote program console 108 may generate a report output 28 to present the returned records 30 in response to query 24. For example, report output 28 may include a table and/or any other form of representing data. In an implementation, remote program console 108 may split the returned records 30 into the individual console output messages 15 included in the returned records 30. Remote program console 108 may present the individual console output messages 15 in the report output 28. Reports outputs 28 may be filtered and/or searched. As such, remote program console 108 may provide a more flexible and/or useful tool than a native console.

Environment 100 may be used to capture console output data generated from applications 10 running on a plurality of game devices 102. As errors occur in applications 10, the console output may be captured and sent to data repository 22 for storage for later retrieval and/or analysis. By recording the console output remotely, the console output may be accessed later in remote program console 108, an environment potentially more suited to understanding and/or resolving any issues. Moreover, by aggregating the console output from a plurality of game devices 102 and recording the console output remotely, the console output may be quickly processed and/or filtered by query-based techniques, making the console output easier to analyze. In addition, environment 100 may make it easier to understand the vast amount of information generated by applications 10 in development across a large number of game devices 102.

Figure 3:
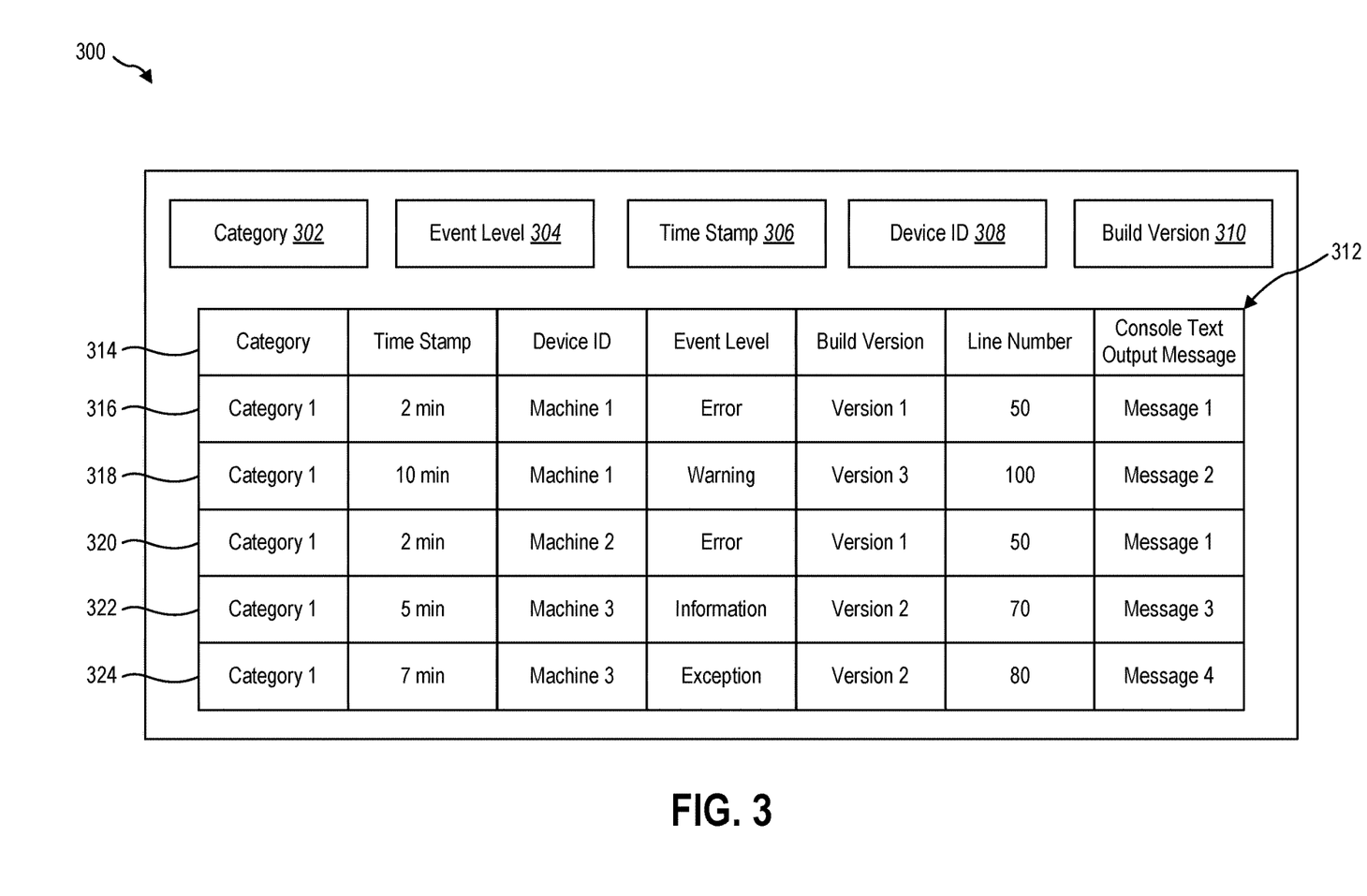
FIG. 3 illustrates an example remote program console for use with an implementation of the present disclosure.

Referring now to FIG. 3, an example remote program console display 300 may include a plurality of parameters 26 (FIG. 1) a user may select when building a query 24 (FIG. 1) to send to telemetry service 106 (FIG. 1). For example, a user may select or otherwise specify one or more parameters 26, such as, but not limited to, a category 302, an event level 304, a timestamp 306, a device ID 308, and/or a build version 310. If a user selects a parameter 26 and/or provides information for a parameter 26, the selected parameter 26 may be included in a filter used by query 24. If a user leaves a parameter 26 blank and/or does not select a parameter 26, the parameter 26 may not be included in a filter used by query 24. For example, if a user enters in a machine name for the device ID 308, query 24 may filter the console telemetry events 12 to the console telemetry events 12 matching the machine name. As such, the plurality of parameters 26 may be used to filter the returned records 30 (FIG. 1) provided by telemetry service 106 in response to the query 24.

Remote program console display 300 may include a table 312 outputting the returned records 30 in response to query 24. Table 312 may include a header row 314 with the various fields included in the console telemetry events 12. For example, row 314 may include the following fields: category; timestamp; device ID; event level; build version; line number; and console output text message. Table 312 may also include a plurality of rows 316, 318, 320, 322, 324 with the returned records 30 from telemetry service 106 matching the selected parameters 26 for query 24. For example, the user may have selected "Category 1" for the category 302 and table 312 may present the console telemetry events 12 for "Category 1."

Table 312 may be used to identify similarities between console telemetry events 12. For example, rows 316 and 320 may be used to identify an error that occurred in the application on different machines (e.g., Machine 1 and Machine 2) at the same time (e.g., 2 minutes) and place in the application (e.g., program code line 50).

Users may also use table 312 to aid in troubleshooting problems that may arise during the development process of application 10 and/or during execution of application 10. Problems may arise infrequently within an application 10 and an application developer may miss the problem if the application developer is unable to monitor the console output at the correct time when the problem occurred. In addition, a significant cost in software development may include testing and fixing bugs that may be undiscovered until after release of a software product. As such, remote program console display 300 may be used by users to perform searches and to review the data previously collected relating to application 10 when problems and/or issues are identified for application 10 during development and/or after release of application 10.

For example, row 324 may identify the problem the user is researching. The user may use the information from console telemetry event 12 for row 324 (e.g., that Message 4 was outputted from application 10 on Machine 3 at 7 minutes at line 80 in the program code) in troubleshooting the problem. Another example may include row 318 provides information about a warning in application 10. For example, a user may use the information from console telemetry event 12 for row 318 (e.g., that Message 2 was outputted from application 10 on Machine 1 at 10 minutes) to resolve a potential problem in application 10. Another example may include row 322 provides information about why performance issues may have occurred for application 10. For example, the information from console telemetry event 12 for row 322 may provide information about network related problems (e.g., Message 3 indicated that the network connection was poor or unavailable for Machine 3 at 5 minutes of game play).

Users may modify the selected parameters 26 and the returned records 30 displayed in table 312 may include previously excluded console telemetry events 12 that match the newly selected parameters 26. In addition, table 312 may no longer display console telemetry events 12 that are different from the newly selected parameters 26 and previously displayed console telemetry events 12 may be removed from table 312. As such, as users modify and/or change the selected parameters 26, the console telemetry events 12 included in the returned records 30 displayed in table 312 may be filtered in a nondestructive manner including previously removed results in subsequent queries 24 in response to the changing parameters 26. Moreover, the returned records 30 displayed in table 312 may be updated in a flexible and/or dynamic manner in response to the changing parameters 26.

As such, remote program console 108 may provide a catch all for identifying and/or troubleshooting problems associated with applications 10. In addition, remote program console 108 may provide a more flexible and/or useful tool than a native console.

Figure 4:
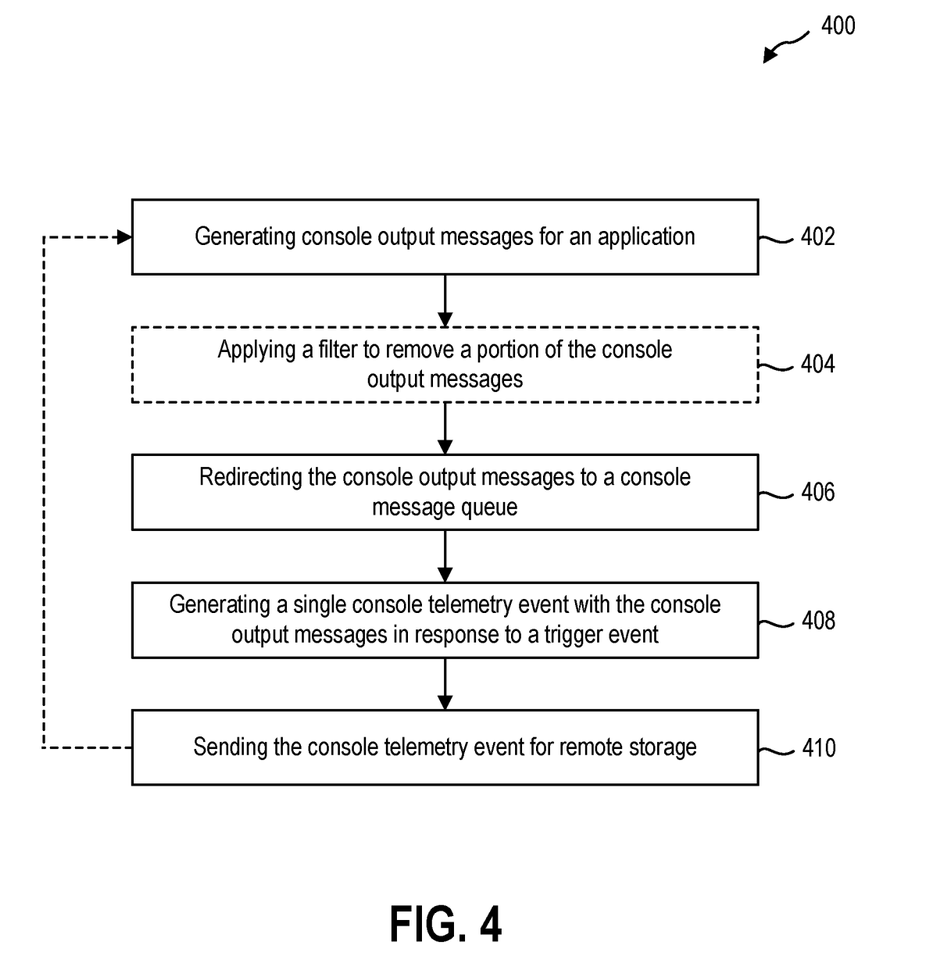
FIG. 4 illustrates an example method flow for redirecting console output in accordance with an implementation of the present disclosure.

Referring now to FIG. 4, an example method 400 may be used by a game device 102 (FIG. 1) for redirecting console output for remote storage. The actions of method 400 may be discussed below with reference to the architecture of FIG. 1.

At 402, method 400 may include generating console output messages for an application. Game devices 102 may generate a plurality of console output messages 15 as applications 10 execute or otherwise run on game devices 102. Console output messages 15 may include, but is not limited to, text output with information regarding an operation and/or status of an application. For example, users may use the console output messages 15 to debug and/or troubleshoot the application.

Application 10 may include commands throughout the application program code 14 to generate or otherwise capture information to include in the console output messages 15. For example, a plurality of LOG commands throughout the application program code 14 may be used to record the application information and console output messages 15 to present on the console. As such, as the commands execute in the application program code 14, console output messages 15 may be generated with text information relating to application 10.

At 404, method 400 may optionally include applying a filter to remove a portion of the console output messages. A portion of the console output messages 15 may be filtered, or otherwise removed, from transmitting to a console message queue 17. As such, instead of sending all the console output messages 15 to the console message queue 17, a portion or a subset of the console output messages 15 may be transmitted to the console message queue 17. The filtering may be applied to improve system performance by reducing the amount of console output messages 15 redirected to the console message queue 17.

At 406, method 400 may include redirecting the console output messages to a console message queue. In an implementation, the console may be unavailable or disabled on the game device 102 resulting in the inability to display or otherwise access the console output for application 10. As such, the console output messages 15 for application 10 may be unavailable or otherwise inaccessible by users. The console output messages 15 may be redirected to a console message queue 17 instead of presenting on a console of game device 102. The logic to redirect the console output to the console message queue 17 may be added to existing program code with minimal changes. For example, each of the various commands throughout application program code 14 to capture the console output may remain the same.

In an implementation, the console output messages 15 may be redirected to the console message queue 17 in addition to presenting on a console of game device 102. For example, a macro and/or a wrapper function may intercept a call to the underlying console output function in the application program code 14 and may redirect the console output to the console message queue 17 or send the console output to both the console and the console message queue 17. As such, application developers may continue to have console output messages 15 presented on the console while the console output messages 15 may also be sent to the console message queue 17.

At 408, method 400 may also include generating a single console telemetry event with the console output messages in response to a trigger event. For example, a new console telemetry event 12 may be generated for a plurality of console output messages 15 in the console message queue 17 in response to a trigger event.

An example trigger event may include the number of console output messages 15 waiting in the console message queue 17 reaching a predetermined number (e.g., when the console message queue 17 is full or one hundred console messages 15). For example, a new console telemetry event 12 may be generated when the number of console output messages 15 waiting in the console message queue 17 reaches a maximum capacity of the console message queue 17. The new console telemetry event 12 may include all the console output messages 15 currently in the console message queue 17. Another example trigger event may include a predetermined time interval. For example, a new console telemetry event 12 may be generated with all the console output messages 15 waiting in the console message queue 17 after ten minutes. Another example trigger event may include exiting or closing application 10. For example, a new console telemetry event 12 may be generated with the console output messages 15 in the console message queue 17 when application 10 closes. Moreover, new console telemetry events 12 may be generated in response to the occurrence of a combination of trigger events occurring. For example, a new console telemetry event 12 may be generated from the plurality of console output messages 15 in the console message queue 17 after twenty minutes and after two hundred console output messages 15 are received in console message queue 17.

As such, a single console telemetry event 12 may include an aggregation of a plurality of console output messages 15 generated by application 10. Once a new console telemetry event 12 is generated with the console output messages 15 in the console message queue 17, the console message queue 17 may start receiving additional console output messages 15 in response to commands executing in application 10.

Each console telemetry events 12 may include a plurality of fields identifying the information captured for application 10. Example fields may include, but are not limited to, categories, event levels, timestamps, device IDs, build versions, application program code line numbers, and/or console output text messages. The fields may be used to include and/or exclude messages from search results of console telemetry events 12. Moreover, the fields may be used to perform different processing on console telemetry events 12. For example, a console telemetry event 12 with an error level may be processed or handled differently than a console telemetry event 12 with a warning level. The fields may also be used to identify similarities between console telemetry events 12 and/or common data shared among console telemetry events 12.

In addition, console telemetry events 12 may include information regarding events generated in response to a user action. One example may include console telemetry events 12 providing information about current network conditions of game device 102. Another example may include console telemetry events 12 providing information about errors in applications 10. Another example may include console telemetry events 12 providing information used to analyze the performance of applications 10.

At 410, method 400 may include sending the console telemetry event for remote storage. Game device 102 may include a telemetry subsystem 16 that may receive one or more console telemetry events 12 generated by application 10. Telemetry subsystem 16 may transmit the console telemetry events 12 to a remote telemetry service 106 via network 104 for remote storage. For example, telemetry subsystem 16 may send console telemetry events 12 to telemetry service 106 using a Hypertext Transfer Protocol (HTTP) request.

Telemetry service 106 may include a data repository 22 that stores the received console telemetry events 12 with information relating to applications 10. Telemetry service 106 may receive console telemetry events 12 from a plurality of game devices 102. In addition, telemetry service 106 may receive console telemetry events 12 for a plurality of applications 10. Data repository 22 may include a vast amount of information relating to a plurality of applications 10 from a plurality of game devices 102. The information may be generated during the development process of application 10 across a plurality of game devices 102. In addition, the information may be generated during execution of application 10 across a plurality of game devices 102. The information may be used at later times to understand and/or resolve any issues relating to applications 10 that may arise.

In an implementation, telemetry subsystem 16 may hold a plurality of console telemetry events 12 (up to n, where n is an integer) in an event queue 18 and may transmit a plurality of console telemetry events 12 at the same time to telemetry service 106. By transmitting a plurality of console telemetry events 12 together to telemetry service 106 instead of individually, a system processing cost associated with transmitting the console telemetry events 12 may be reduced.

Telemetry subsystem 16 may transmit a plurality of console telemetry events 12 in response to the occurrence of one or more trigger events 20. An example trigger event 20 may include a predetermined number of events waiting in event queue 18. For example, telemetry subsystem 16 may transmit the plurality of console telemetry events 12 in response the number of console telemetry events 12 in event queue 18 reaching the predetermined number of events (e.g., two hundred console telemetry events 12).

Another example trigger event 20 may include a predetermined time interval. For example, telemetry subsystem 16 may transmit the plurality of console telemetry events 12 in event queue 18 upon the predetermined time interval elapsing (e.g., every twenty minutes). Another example trigger event 20 may include exiting or closing application 10. For example, telemetry subsystem 16 may transmit the plurality of console telemetry events 12 before application 10 shuts down. Moreover, telemetry subsystem 16 may transmit the plurality of console telemetry events 12 in response to the occurrence of a combination of trigger events 20 occurring. For example, telemetry subsystem 16 may transmit the plurality of console telemetry events 12 after twenty minutes and two hundred console telemetry events 12 are received in event queue 18.

Telemetry subsystem 16 may optionally apply a filter to the plurality of console telemetry events 12 and may send a subset of the plurality of console telemetry events 12 in response to the filter. For example, telemetry subsystem 16 may filter the plurality of console telemetry events 12 using the one or more fields of console telemetry events 12. One example may include sending a subset of console telemetry events 12 with a specified category. As such, instead of sending all console telemetry events 12, telemetry subsystem 16 may only send a portion or a subset of console telemetry events 12 to telemetry service 106.

As such, method 400 may be used to redirect the console output to remote storage using console telemetry events 12. By aggregating the console output from a plurality of game devices and recording the console output remotely, the console output may be accessed later in an environment potentially more suited to understanding and/or resolving any issues. Moreover, the vast amount of information generated by applications 10 in development across a plurality of game devices 102 may be captured and retained in the remote storage.

Figure 5:
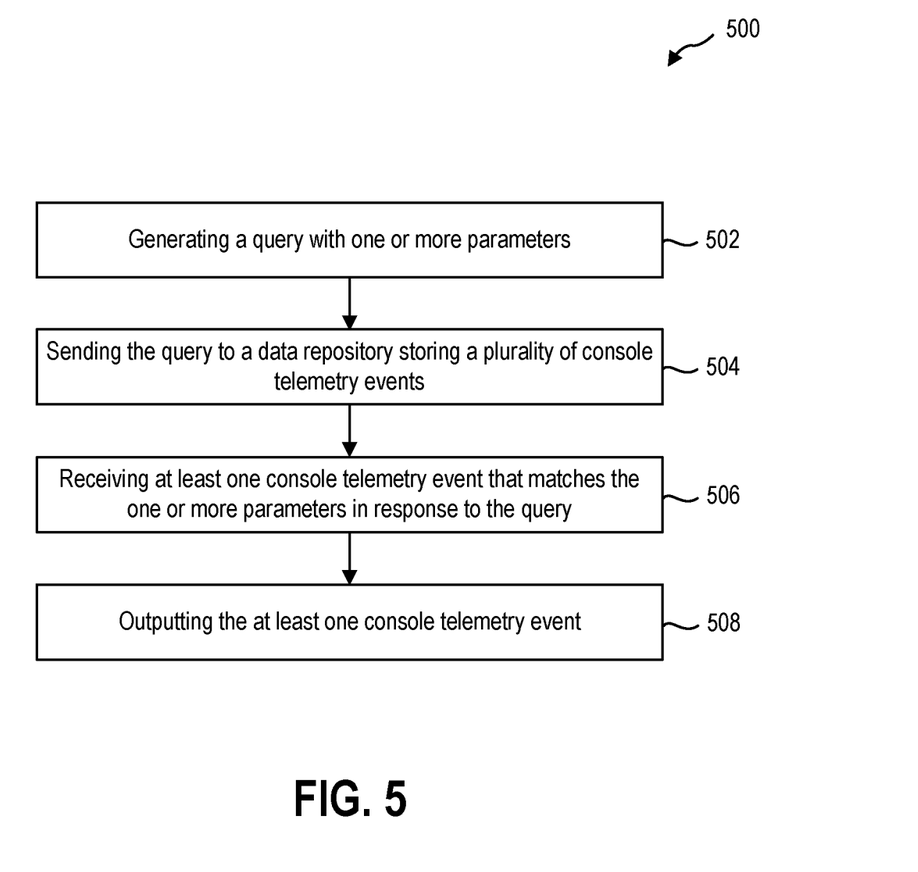
FIG. 5 illustrates an example method flow for accessing stored console telemetry events in accordance with an implementation of the present disclosure.

Referring now to FIG. 5, an example method 500 may be used by a remote program console 108 to access stored console telemetry events generated by applications 10 running on game devices 102. Remote program console 108 may emulate a program console remotely from game devices 102 so that users may view, or otherwise access, the console output from telemetry service 106 via network 104. For example, remote program console 108 may be a web-based dashboard or report style application that a user may access to view or otherwise access console telemetry events 12 stored by telemetry service 106. Remote program console 108 may access console output generated by applications 10 running on game devices 102 and may allow users to view console output outside of the development environment. As such, remote program console 108 may be used to access otherwise inaccessible console output from game devices 102. The actions of method 500 may be discussed below with reference to the architecture of FIGS. 1 and 3.

At 502, method 500 may include generating a query with one or more parameters. Remote program console 108 may generate one or more queries 24 used to access or otherwise retrieve console telemetry events 12 from telemetry service 106. Users may access remote program console 108 anytime a user may want to understand what type of data application 10 is outputting. In addition, users may access remote program console 108 to troubleshoot errors and/or issues relating to application 10.

A user may select or otherwise specify one or more parameters 26, such as, but not limited to, a category 302, an event level 304, a timestamp 306, a device ID 308, and/or a build version 310 to include in query 24. If a user selects a parameter 26 and/or provides information for a parameter 26, the selected parameter 26 may be included in a filter used by query 24. If a user leaves a parameter 26 blank and/or does not select a parameter 26, the parameter 26 may not be included in a filter used by query 24. Remote program console 108 may generate one or more queries 24 in response to the selected parameters 26.

At 504, method 500 may include sending the query to a data repository storing a plurality of console telemetry events. Remote program console 108 may send one or more queries 24 to telemetry service 106 to access or otherwise retrieve console telemetry events 12 stored in data repository 22. Remote program console 108 may filter the console telemetry events 12 by applying one or more parameters 26 to the query 24.

At 506, method 500 may include receiving at least one console telemetry event that matches the one or more parameters in response to the query. Telemetry service 106 may receive the queries 24 from remote program console 108 and may return one or more records 30 that match the parameters 26 of the query 24. For example, the user may have selected a machine name for the device ID and the returned records 30 may include all console telemetry events 12 for the selected machine name.

At 508, method 500 may include outputting at least one console telemetry event. Remote program console 108 may provide information regarding application 10 in an easy to understand manner. Remote program console 108 may generate a report output 28 to present the returned records 30 in response to query 24. Report output 28 may include, for example, a table and/or any other form of representing data. Reports outputs 28 may be filtered and/or searched. As such, remote program console 108 may provide a more flexible and/or useful tool than a native console.

Method 500 may be used to quickly process and/or filter the console output from a plurality of game devices 102, resulting in making the console output easier to analyze. In addition, method 500 may be used to understand the vast amount of information generated by applications in development across a plurality of game devices.

Figure 6:
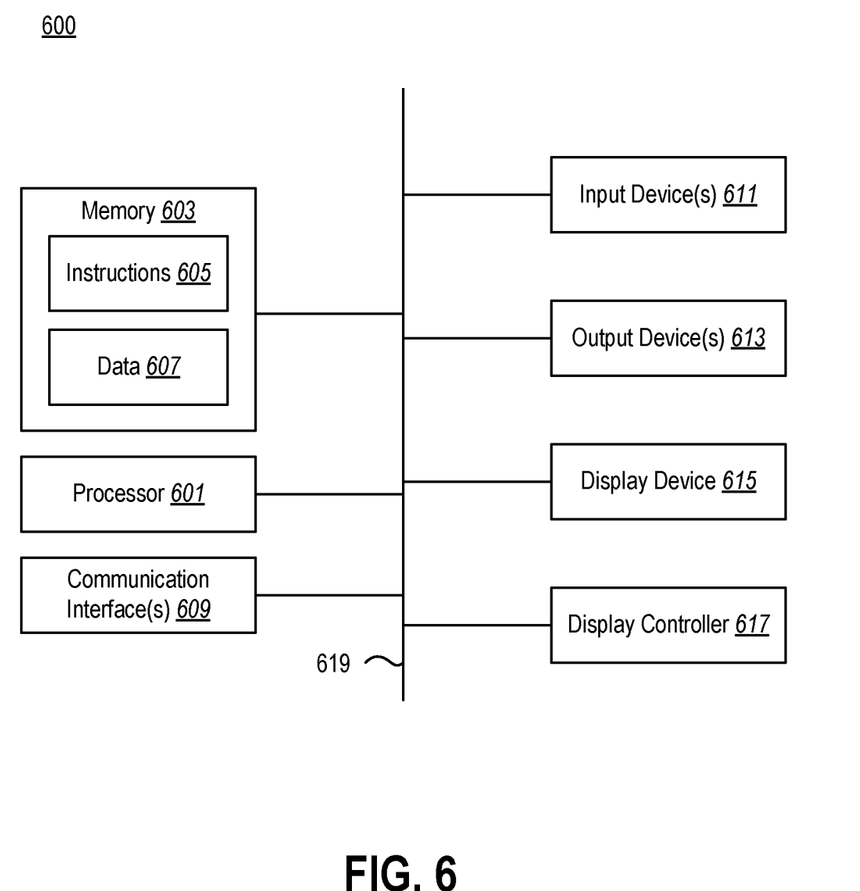
FIG. 6 illustrates certain components that may be included within a computer system.

FIG. 6 illustrates certain components that may be included within a computer system 600. One or more computer systems 600 may be used to implement the various devices, components, and systems described herein.

The computer system 600 includes a processor 601. The processor 601 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during execution of the instructions 605 by the processor 601.

A computer system 600 may also include one or more communication interfaces 609 for communicating with other electronic devices. The communication interface(s) 609 may be based on wired communication technology, wireless communication technology, or both. Some examples of communication interfaces 609 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 600 may also include one or more input devices 611 and one or more output devices 613. Some examples of input devices 611 include a keyboard, mouse, microphone, remote control device, button, joystick, trackball, touchpad, and lightpen. Some examples of output devices 613 include a speaker and a printer. One specific type of output device that is typically included in a computer system 600 is a display device 615. Display devices 615 used with embodiments disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result.

The present disclosure may be embodied in other specific forms without departing from its spirit or characteristics.

The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A game device, comprising:
   a memory to store data and instructions; and
   at least one processor operable to communicate with the memory, wherein the at least one processor is operable to:
   generate console output messages for an application running on the game device, wherein a console that provides an interface to output information regarding an operation or status of the application is unavailable or disabled on the game device;
   redirect the console output messages from presenting on the console to a console message queue;
   generate a single console telemetry event in response to a trigger event, wherein the console telemetry event captures the console output messages in the console message queue; and
   send the console telemetry event to remote storage, wherein a remote program console accesses the console telemetry event in the remote storage and emulates the console on the game device by presenting the console output messages for the application.

2. The game device of claim 1, wherein the console output messages include text output regarding an operation or status of the application.

3. The game device of claim 1, wherein the console is an interface where the console output messages are displayed separate from application output.

4. The game device of claim 1, wherein the console telemetry event is a new telemetry event generated using the console output messages.

5. The game device of claim 1, wherein the console output messages are generated in response to commands throughout an application program code for the application, and
   wherein minimum changes occur to the application program code to redirect the console output messages to the console message queue.

6. The game device of claim 5, wherein each of the commands throughout the application program code to generate the console output messages remains the same.

7. The game device of claim 1, wherein the trigger event includes one or more of a predetermined number of console output messages waiting in the console message queue, a predetermined time interval, or the application closing.

8. The game device of claim 1, wherein the processor is further operable to:
   apply a filter to remove a portion of the console output messages; and
   send a subset of the console output messages to the console message queue.

9. The game device of claim 1, wherein the application is a game.

10. A method, comprising:
    generating, at a game device, console output messages for an application running on the game device, wherein a console that provides an interface to output information regarding an operation or status of the application is unavailable or disabled on the game device;
    redirecting the console output messages from presenting on the console to a console message queue;
    generate a single console telemetry event in response to a trigger event, wherein the console telemetry event captures the console output messages in the console message queue; and
    send the console telemetry event to remote storage, wherein a remote program console accesses the console telemetry event in the remote storage and emulates the console on the game device by presenting the console output messages for the application.

11. The method of claim 10, wherein the console output messages include text information regarding an operation or status of the application.

12. The method of claim 10, wherein the console is an interface where the console output messages are displayed separate from application output.

13. The method of claim 10, wherein the console telemetry event is a new telemetry event generated using the console output messages.

14. The method of claim 10, further comprising:
    generating the console output messages in response to commands throughout an application program code for the application,
    wherein minimum changes occur to the application program code for redirecting the console output messages to the console message queue.

15. The method of claim 14, wherein each of the commands throughout the application program code to generate the console output messages remains the same.

16. The method of claim 10, wherein the trigger event includes one or more of a predetermined number of console output messages waiting in the console message queue, a predetermined time interval, or the application closing.

17. The method of claim 10, further comprising:
    applying a filter to remove a portion of the console output messages; and
    sending a subset of the console output messages to the console message queue.

18. The method of claim 10, wherein the application is a game.

19. A computer-readable medium storing instructions executable by a computer device, comprising:
    at least one instruction for causing the computer device to generate console output messages for an application running on the computer device, wherein a console that provides an interface to output information regarding an operation or status of the application is unavailable or disabled on the computer device;
    at least one instruction for causing the computer device to redirect the console output messages from presenting on the console to a console message queue;
    at least one instruction for causing the computer device to generate a single console telemetry event in response to a trigger event, wherein the console telemetry event captures the console output messages in the console message queue; and
    at least one instruction for causing the computer device to send the console telemetry event to remote storage, wherein a remote program console accesses the console telemetry event in the remote storage and emulates the console on the game device by presenting the console output messages for the application.

20. The game device of claim 1, wherein the remote program console is used to access the otherwise inaccessible console output from the game device later outside of an application development environment to resolve issues in the application captured by the console output messages.

* * * * *